Figure 1:
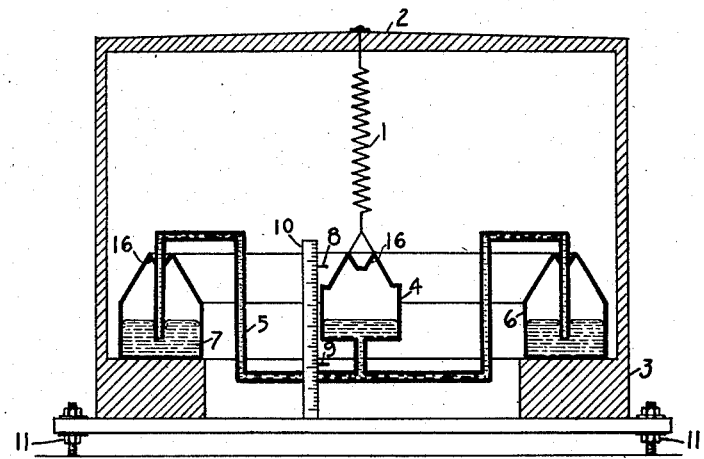
Figure 2:
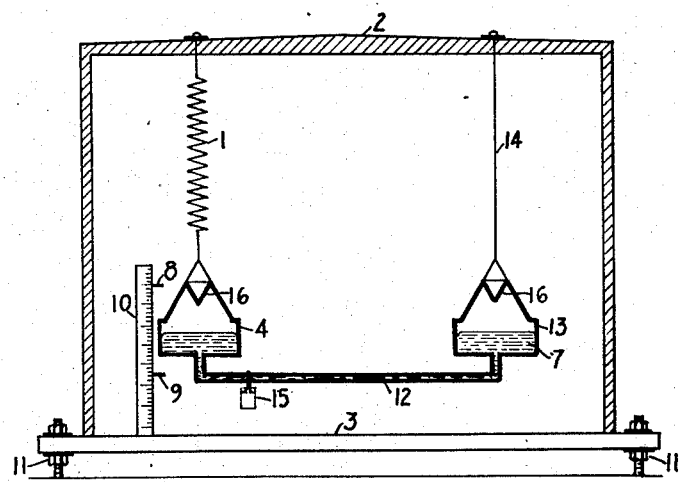

May 17, 1938.    H. M. EVJEN    2,117,471

GRAVIMETER

Filed Feb. 20, 1937

INVENTOR: Haakon M. Evjen

BY HIS ATTORNEY *H. Birch*

Patented May 17, 1938

2,117,471

UNITED STATES PATENT OFFICE 2,117,471

GRAVIMETER

Haakon Muus Evjen, Houston, Tex., assignor to Shell Development Company, San Francisco, Calif., a corporation of Delaware Application February 20, 1937, Serial No. 126,866

7 Claims. (Cl. 265—1.4)

The accurate determination of variation of the gravity field in the earth is of great importance as an aid in the exploration of the earth's crust for deposits of minerals. By means of measurements of the gravity field it is sometimes possible to determine the position of such deposits.

In the past it has been the practice to use various instruments such as the Sternbeck pendulum and the Eötvös balance. Measurements however effected with these instruments require considerable manipulation and time. It is therefore a main object of this invention to devise an instrument for the determination of the gravitational acceleration of the earth in a quicker and simpler manner than heretofore.

The instrument according to my invention comprises a hollow mass connected to a vertical spring and a fluid system whereby upon the lengthening of the spring, amounts of fluid flow into the mass increasing its weight and further lengthening the spring. By this means it will be seen that a slight change in the length of the spring produced by a variation in the gravity field will result in a readily measurable change in the position of the mass. It will thus be seen that a spring capable of sustaining a considerable mass may be made of any desired sensitivity. According to the present invention, this is effected by automatically causing the deformation due to the action of a primary force to bring into action an auxiliary force which tends to increase said deformation still further. The amount of deformation increase can be controlled as desired.

The further details of my invention will be readily apparent from the attached drawing which illustrates by way of example, particular forms of my invention.

Figure I is a schematic view of a form of my invention employing two fluid containers attached to the base.

Figure II is a schematic view of another form of my invention using only one fluid container attached to the base.

Referring to Figure I, a coil spring 1 is suspended at its upper end from a beam 2 forming part of the base 3. The lower end of the spring 1 is attached to a pan 4. This pan is attached by a tube system 5 to an annular container 6 attached to the base 3 of the instrument. The tube system is completely filled with fluid 7 and the pan 4 and container 6 are partially filled. The tube 5 as will be seen from the drawing, extends into liquid in container 6 and is free to move up or down within certain limits without coming above the surface of the liquid. Stops 8 and 9 on the scale 10 define the limits within which the pan 4 can move. The tube 5 is rigidly attached to the pan 4. For the purpose of illustration the spring 1 will be assumed to obey Hooke's law, the force F acting on the spring then, is given by $F = K(L - L_0)$ where K is a constant of the spring, L is the length of the spring and $L_0$ is the unstretched length. In a gravity meter the force F will be gravitational. The gravitational force is given by $F_g = (M_1 - M_0)g$, where $g$ is the acceleration of gravity, $M_0$ is a constant mass and $M_1$ is a mass proportional to the length of spring L, so that the above equation may be written as follows:—$F_g = (cL - M_0)g$, wherein $M_1 = cL$ $c$ being a constant. The value of $c$ and $M_0$ depends on the cross sectional areas of the two fluid surfaces, the density of the fluid, the mass of the pan 4 and communicating tube 5 and also on the level of fluid in the pans 6. These constants can be given any preassigned values by the proper design of the apparatus.

In order to effect gravity measurements by means of the present apparatus, the latter is properly leveled and calibrated, the liquid in pan 4 being at the same level as in container 6, with which it is in communication by means of the liquid-filled tube system 5. It will be seen that any increase in the value of the gravity force acting on the mass of pan 4 will cause said pan to move downwards, stretching the spring 1. The liquid within the pan 4 will, however, tend to remain at the same level as in container 6, a certain amount of liquid being therefore syphoned into pan 4 from container 6 through the tube system 5. The resulting increase in the mass of liquid in pan 4 will cause a further stretching of the spring 1 and accentuate the downward movement of pan 4. It is obvious that a reverse process will take place in case of any decrease in the value of the force of gravity, a portion of the liquid being in such case syphoned from pan 4 to the container 6.

Suppose for the sake of simplicity that the elastic force and the gravitational force are the only forces acting. In other words suppose we want to measure the gravitational force. In order to have equilibrium we must then have $$K(L - L_0) - (cL - M_0)g = 0,$$

consequently $$g = \frac{K(L - L_0)}{(cL - M_0)}$$

For small changes in gravity we get $$\Delta g/g = \frac{(cL_0 - M_0)\Delta h}{(L - L_0)(cL - M_0)}$$

By properly adjusting the constants of the apparatus it is therefore possible to obtain any preassigned displacement $\Delta h$ for a given relative change in gravity. By adjusting the constants K, c, $L_0$ and $M_0$, it is possible to make the instrument indifferently stable; that is, so that for a given value of gravity it will be stable for any value of L. By this arrangement the instrument will be infinitely sensitive to changes in gravity. For small changes in gravity the instrument will have no position of stability. There will, however, be a position of metastability where the elastic forces exactly balance the other forces. The position of metastable equilibrium may be used for the purpose of measuring forces. If the forces are measured by the metastability method the measurement consists in bringing the point of metastability always back to the same point. This may be done for example, by adding or removing small weights to the body 4; by raising or lowering the container 6; by raising or lowering the point of suspension of the main spring 1 or by divers other ways as will be apparent to those skilled in the art.

If the forces are measured by the stable method the point of stability either may be brought back to the same point by one of the means described above or the displacement of the body 4 may be read on the scale 10.

When the instrument is used as a very high precision gravity meter it is necessary that it be accurately leveled. If the containers 4 and 6 are annular in shape the need for accurate leveling is reduced to within reasonable limits. Leveling may be effected by leveling screws 11 mounted on the base 3.

Referring to Figure II which shows a modification of the instrument shown in Figure I, like parts are given like numerals. A spring 1 is suspended from a beam 2 forming part of the base 3 and has at its lower end a pan 4. A tube 12 connects the pan to a second pan 13 which is suspended from the beam 2 by an inelastic flexible member 14. Liquid 7 may freely pass from pan 4 to pan 13 and vice versa.

A movable weight 15 may be suspended from the tube 12. The force may be measured by moving the position of weight 15 on the tube 12, and by adding similar weights until the position of equilibrium has been brought back to the starting point. Other means of effecting this are similar to those herein described with reference to Figure I. If the instrument has a position of stable equilibrium the displacement of the pan 4 can be measured on the scale 10. When the instrument either in the form shown in Figure I or in the form shown in Figure II is transported it is necessary to provide suitable clamping mechanism in order that the spring is not distorted. It is furthermore necessary to prevent the spilling of liquid and for this purpose the collars 16 are provided at the top of each container or pan.

Where extreme accuracy is required the effects of temperature and other weather conditions must be compensated in order that observations at different locations may be correlated. The methods of effecting such compensations are well known in the art and are not claimed herein.

I claim as my invention:

1. In a measuring instrument for the determination of gravity acceleration, a spring, a hollow body suspended from said spring, fluid in said body, a fluid conduit connected to said body and means whereby upon a change in the position of said body produced by a change in gravitational acceleration, a fluid flow alters the mass of said body increasing said initial change in position.

2. In a measuring instrument for the determination of gravity acceleration, a base, a spring suspended from said base, a hollow body suspended from said spring, fluid in said body, a liquid container mounted on said base, a fluid conduit connecting said container with said hollow body, whereby upon an initial change in the position of said body produced by a change in gravitational acceleration fluid flows between said container and said body increasing said initial change in position of said body.

3. In a measuring instrument for the determination of gravity acceleration, a base, a spring attached at one end to said base, a hollow body suspended from the other end of said spring, fluid in said body, an annular container mounted on said base, a fluid conduit connected at its midpoint to said body and having its ends dipping into the fluid in said container, a scale mounted behind said body whereby the relative change in position of said body may be measured and the value of gravity acceleration determined.

4. In a measuring instrument for the determination of variations of gravity acceleration, a base, a spring attached at one end to said base, a hollow body suspended from the other end of said spring, fluid in said body, a container of fluid suspended from said base, a horizontal fluid conduit connecting said container to said body and a movable weight mounted on said horizontal conduit.

5. In a measuring instrument for the determination of gravity acceleration, a hollow body yieldably supported against the action of the force of gravity, fluid in said body, a fluid conduit to said body, and means whereby upon a vertical displacement of said body produced by a change of gravitational acceleration, a fluid flow alters the mass of said body increasing said initial displacement.

6. In a measuring instrument for the determination of gravity acceleration, an annular liquid container, a hollow body, spring means adapted to suspend said body centrally with regard to said container, fluid in said body and said container, and means comprising a fluid filled conduit connecting said body with said container, whereby upon an initial vertical displacement of said body produced by a change of gravitational acceleration, fluid is caused to flow between said body and said container increasing said initial displacement.

7. The apparatus of claim 6, having a plurality of fluid filled conduits connecting the hollow body to the annular container, said conduits being arranged symmetrically with regard to said hollow body.

HAAKON MUUS EVJEN.